Patented May 6, 1924.

1,493,099

UNITED STATES PATENT OFFICE.

CHARLES BRAMSON, OF JOLIET, ILLINOIS.

MANUFACTURE OF PHOSPHATE SALTS AND PHOSPHORIC ACID.

No Drawing.  Application filed May 16, 1923. Serial No. 639,456.

*To all whom it may concern:*

Be it known that I, CHARLES BRAMSON, a citizen of the United States of America, residing at Joliet, in the county of Will and State of Illinois, have invented certain Improvements in the Manufacture of Phosphate Salts and Phosphoric Acid, of which the following is a specification.

This invention relates to a new and useful process for the recovery of the waste product occurring in the manufacture of phosphate salts and commercial phosphoric acid.

In order to be able to use crude phosphoric acid obtained from rock phosphate for the manufacture of phosphate salts, such as mono-calcium phosphate, di-calcium phosphate, sodium phosphate, etc., or commercially pure phosphoric acid, it must be first purified from its iron, aluminium salts and fluorides.

This is usually done by the well known process of partially neutralizing the crude phosphoric acid with marble dust or lime water until practically all the iron, aluminium and fluorides are precipitated out. This precipitate, which in the plant goes under the name of "fertilizer" or "press cake" is washed, dried and sold to fertilizer concerns for its citrate-soluble content of anhydrous phosphoric acid—$P_2O_5$, for a price not much above the handling and drying the same.

This material analyzes, when dry, about 50% di-calcium phosphate, 17–26% iron and aluminium phosphate, 10% calcium fluoride with some calcium sulfate, silica and moisture 10%. Before being dried it runs about 60–70% moisture, and presents many difficulties in drying and handling it. A too high temperature cannot be used, as it is likely to change the dicalcium phosphate into pyrophosphate, i. e., make it citrate-insoluble; a too big draft is objectionable, the product, being extremely light, will go up in the air.

It is usually presents a loss from 25% to 30% of the original rock phosphate for the plant use.

The object of the invention is to cut down this loss to 6% or 8% equivalent to the amount of iron and aluminium salts there are in the rock phosphate.

The analysis of the waste-material— "press cake" shows it to be a half dicalcium phosphate—a salt very valuable in itself or for plant use when pure. A very easy and convenient process to recover the dicalcium phosphate from the "press cake" is a material part of the present invention.

The reason for the large amount of dicalcium phosphate coming down together with the impurities is due to the following considerations. Crude phosphoric acid, disregarding the impurities, is essentially a mixture of free phosphoric acid $H_3PO_4$ and mono-calcium phosphate $Ca(H_2PO_4)_2$. Mono-calcium phosphate is an unstable salt and readily dissociates into as follows:

*Equilibrium equation.*

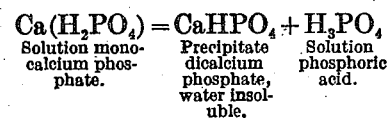

Ca($H_2PO_4$) = CaHPO$_4$ + $H_3PO_4$
Solution mono-   Precipitate   Solution
calcium phos-    dicalcium    phosphoric
phate.           phosphate,   acid.
                 water insol-
                 uble.

Dicalcium phosphate is insoluble in water, but soluble in phosphoric acid.

As long as there is enough free acid any of the dicalcium will stay in solution. Upon partial neutralization, however, i. e., the addition of marble dust, or lime water, the free acid is diminished, hence dicalcium phosphate precipitates out until equilibrium is established. Now then, if to the unfiltered, partially neutralized liquor I add a sulfate or acid sulfate of the alkali-metals, which form water soluble dibasic salts, the following takes place. The alkali sulfate will interchange ions with the mono-calcium phosphate, i. e., calcium sulfate, and alkali phosphate will form. The calcium sulfate, being very slightly soluble, will precipitate out, while the dicalcium-phosphate which precipitated out while adding the lime, will go back in solution to establish equilibrium. The following equations will give an idea what takes place:

1. 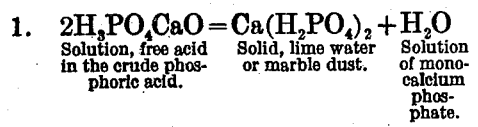 2$H_3PO_4$CaO = Ca($H_2PO_4$)$_2$ + $H_2O$
Solution, free acid   Solid, lime water   Solution
in the crude phos-    or marble dust.     of mono-
phoric acid.                              calcium
                                          phos-
                                          phate.

Partial neutralization, addition of lime or marble dust in which the impurities precipitate out.

2. $\underset{\text{Solution.}}{Ca(H_2PO_4)_2} = \underset{\substack{\text{Precipitate} \\ \text{of dicalcium,} \\ \text{loss with impurities.}}}{CaHPO_4} + \underset{\text{Solution.}}{H_3PO_4}$ Dissociation of mono-calcium phosphate into soluble dicalcium and phosphoric acid.

3. $\underset{\text{Solution.}}{Ca(H_2PO_4)_2} + \underset{\substack{\text{Solution of} \\ \text{alkali sulphate.}}}{Na_2SO_4} =$
$\underset{\text{Precipitate.}}{CaSO_4} + \underset{\substack{\text{Solution of} \\ \text{mono-sodium} \\ \text{phosphate,} \\ \text{undissociable.}}}{2NaH_2PO_4}$ Addition of an alkali sulfate.

4. $\underset{\text{Precipitate.}}{CaHPO_4} + \underset{\text{Solution.}}{H_3PO_4} = \underset{\text{Solution.}}{Ca(H_2PO_4)_2}$ The precipitated out dicalcium goes back in solution to establish equilibrium.

In practice, I carry out this as follows:— After the crude phosphoric acid has been partially neutralized and the reaction completed according to tests in plant practice, I add in the same digesting tank from two to five per cent of a sulfate or acid sulfate of the alkali metals, such as salt-cake or niter-cake. I agitate the mixture for five or ten minutes in which the above reactions (3 and 4) take place. The precipitated out dicalcium phosphate goes back in solution and is used in the regular plant process, while the residue, which now consists of calcium sulfate—over 50%, iron and aluminium phosphate, and calcium fluoride, is washed and discarded.

The presence of one or two per cent of a phosphate of the alkali metals are not objectionable in practice, or they are eliminated in further neutralization of the acid liquor and recovering all the anhydrous phosphoric acid and dicalcium phosphate.

Having thus fully described my invention what I claim as new and desire to secure by Letters Patent is:—

1. The herein described step in the process of extracting phosphoric acid from rock phosphate in which the rock phosphate is treated with sulphuric acid and the soluble portions separated and limed, which consists in adding an alkali metal sulphate to the limed and unfiltered liquid to recover the dicalcium phosphate previously precipitated with the iron, aluminum and calcium fluoride impurities.

2. The herein described step in the process of extracting phosphoric acid from rock phosphate in which the rock phosphate is treated with sulphuric acid and the soluble portions separated and limed, which consists in adding an acid sulphate of an alkali metal to the limed and unfiltered liquid to recover the dicalcium phosphate previously precipitated with the iron, aluminum and calcium fluoride impurities.

Signed at Chicago, Illinois, this 14th day of May, 1923.

CHARLES BRAMSON.